Patented Oct. 18, 1932

1,883,683

UNITED STATES PATENT OFFICE

EARL W. GARDNER AND DUDLEY H. FELDER, OF JEFFERSON COUNTY, TEXAS, ASSIGNORS TO THE TEXAS COMPANY, OF NEW YORK, N. Y., A CORPORATION OF DELAWARE

PLASTIC COMPOSITION

No Drawing.    Application filed April 16, 1930.    Serial No. 444,867.

This invention relates to a plastic composition composed of petroleum asphalt, a suitable relatively light petroleum distillate and a mixture of fine asbestos and coarse asbestos.

A number of plastic compositions are well known in commerce which usually are composed chiefly of bituminous pitch, any of a number of vegetable fibrous materials, although asbestos is also occasionally used, a drier or thinner and frequently a coloring pigment. These plastic compositions have various uses, such as insulation for electrical current conductors, floor tile, roofings, and various others. None of the known products, however, have the qualities nor is one especially suitable for the particular purpose for which the present composition is especially designed and suited.

The present invention contemplates a stable plastic substance which, at slightly elevated temperatures, is capable of being evenly distributed over relatively uneven surfaces with a stiff brush or with a trowel and may be finished with the latter implement to present a smooth unbroken surface which will serve as a protection against extreme weather and which will be only slightly affected by changes in atmospheric temperature. It may be further said that after it has set for a desirable period of time it is not readily affected by moderate superatmospheric or subatmospheric temperature, say of the order of 300° F. or —25° F. Consequently it is found especially useful as a coating for heat insulated vessels, pipes, etc., particularly where a dry insulating material having voids, such as hair felt or magnesia block, is used. During the setting or weathering time the plastic composition develops a more or less toughened surface while the under portion of the coating remains plastic and adherent to whatever body it is applied for an indefinitely long period of time. It adheres readily to wood or masonry and also to clean metal and glass surfaces in addition to more uneven surfaces formed by blocks or layers of insulating materials already mentioned.

A particularly advantageous feature of the invention is that the weathered or toughened surface of the mastic may be painted any color desirable with ordinary commercial paint without any subsequent "bleeding through" of the asphaltic or oily constituents of the composition.

Another advantageous feature is that the product may be handled by uneducated, inexperienced labor without any danger of injury to the skin or eyes.

In the manufacture of the product a relatively good grade of commercial petroleum asphalt, preferably of about 165° F. melting point, is heated to such a temperature as to be readily handled by pumps, for example about 300° F. to 350° F. and is delivered into an appropriate mixing tank equipped with heating means and air agitating means. A relatively light petroleum distillate, such as a kerosene distillate, is then pumped in with the hot asphalt. Of the total volume of the two products thus commingled the asphalt constitutes approximately 53% and the distillate approximately 47%.

This mixture may be preferably maintained at appropriate temperature in the tank and a portion of it periodically drawn into a suitable mechanical mixer which is also equipped with heating means for maintaining the substance at an appropriate temperature. To this an asbestos material, consisting of a mixture of fine or powdered and coarse or fibrous asbestos in the approximate proportions of three parts of fine asbestos to one part of coarse asbestos is slowly added and thoroughly mixed with the mixture of asphalt and distillate. After the mixing is carried on for a sufficient length of time to assure a complete dispersion of the asbestos material throughout the mixture the composition may be drawn into suitable packages while it is still in the warm state.

As an example the final homogeneous product may be composed of the following materials in the amounts shown:

| | Per cent |
|---|---|
| Asphalt | 34 |
| Distillate | 26 |
| Fine asbestos | 30 |
| Coarse asbestos | 10 |

Obviously many modifications and variations of the invention, as hereinbefore set forth, may be made without departing from the spirit and scope thereof, and therefore, only such limitations should be imposed as are indicated in the appended claims.

We claim:

1. A plastic composition consisting of petroleum asphalt, kerosene distillate and asbestos in the approximate proportions of 34% of the asphalt, 26% of the distillate and 40% of the asbestos.

2. A plastic composition formed of a troweling consistency and consisting of petroleum asphalt, kerosene distillate and asbestos fiber, said asbestos fiber including a major portion of relatively finely divided particles and a lesser proportion of relatively coarse fibers.

3. A plastic composition consisting of an intimate admixture of petroleum asphalt, kerosene distillate and asbestos, said composition being of a thick or viscous consistency suitable for being applied with a trowel.

In witness whereof we have hereunto set our hands and seals this 31st day of March, 1930.

EARL W. GARDNER.
DUDLEY H. FELDER.